(12) United States Patent
Su et al.

(10) Patent No.: US 10,894,576 B2
(45) Date of Patent: Jan. 19, 2021

(54) BICYCLE REAR DERAILLEUR

(71) Applicant: AD-II Engineering Inc., Taichung (TW)

(72) Inventors: Chien-Hao Su, Taichung (TW); Chung-Ren Chang, Taichung (TW)

(73) Assignee: AD-II ENGINEERING INC., Taichung (TW)

(*) Notice: Subject to any disclaimer, the term of this patent is extended or adjusted under 35 U.S.C. 154(b) by 324 days.

(21) Appl. No.: 16/128,813

(22) Filed: Sep. 12, 2018

(65) Prior Publication Data
US 2019/0144072 A1    May 16, 2019

(30) Foreign Application Priority Data
Nov. 10, 2017    (TW) .............................. 106138926 A

(51) Int. Cl.
*B62M 9/1242*    (2010.01)
*B62M 9/127*    (2010.01)
*B62M 9/125*    (2010.01)

(52) U.S. Cl.
CPC .......... *B62M 9/1242* (2013.01); *B62M 9/127* (2013.01); *B62M 9/125* (2013.01)

(58) Field of Classification Search
USPC ..................................................... 474/80, 82
See application file for complete search history.

(56) References Cited

U.S. PATENT DOCUMENTS

| | | | | |
|---|---|---|---|---|
| 4,193,309 A * | 3/1980 | Nagano | .................. | B62M 9/127 474/82 |
| 4,198,873 A * | 4/1980 | Nagano | ................ | B62M 9/1244 474/82 |
| 4,241,617 A * | 12/1980 | Nagano | ................ | B62M 9/1248 474/82 |
| 4,306,871 A * | 12/1981 | Nagano | .................. | B62M 9/127 474/82 |
| 4,469,479 A * | 9/1984 | Ozaki | .................. | B62M 9/1244 474/80 |
| 4,801,287 A * | 1/1989 | Romano | ................ | B62M 9/124 474/82 |

(Continued)

FOREIGN PATENT DOCUMENTS

CN    204096023 U    1/2015
TW    I331111 B    10/2010

*Primary Examiner* — Henry Y Liu
(74) *Attorney, Agent, or Firm* — Muncy, Geissler, Olds & Lowe, P.C.

(57) ABSTRACT

A bicycle rear derailleur is provided, including a mounting portion; a linkage mechanism, pivoted to the mounting portion and having an extension portion having a cable fixing point and being located at an inner position relative to an outer side of the linkage mechanism; a guiding mechanism, pivoted to the linkage mechanism and being rotatable about an axis, the guiding mechanism including a first pulley defining a pulley plane and a second pulley, an extension line which is perpendicular to the axis and an axial extension line of the second pulley being defined as a first reference line; wherein when the bicycle rear derailleur is located on an initial position, the cable fixing point is between the first reference line and the mounting portion, and the cable fixing point dose not cross the pulley plane during gearshift of the bicycle rear derailleur relative to rear sprockets.

8 Claims, 6 Drawing Sheets

(56) References Cited

U.S. PATENT DOCUMENTS

| | | | | |
|---|---|---|---|---|
| 4,838,837 A * | 6/1989 | Testa | B62M 9/124 | 474/80 |
| 4,840,605 A * | 6/1989 | Testa | B62M 9/124 | 474/80 |
| 4,887,482 A * | 12/1989 | Romano | B62M 9/127 | 74/502.6 |
| 5,163,881 A * | 11/1992 | Chattin | B62M 9/123 | 474/78 |
| 5,346,434 A * | 9/1994 | Hsu | B62M 9/1242 | 474/82 |
| 5,397,273 A * | 3/1995 | Ando | B62M 9/1248 | 474/82 |
| 5,533,937 A * | 7/1996 | Patterson | B62M 9/125 | 474/80 |
| 5,597,366 A * | 1/1997 | Ozaki | B62M 9/1244 | 474/82 |
| 5,618,241 A * | 4/1997 | Ose | B62K 23/06 | 474/127 |
| 5,620,383 A * | 4/1997 | Patterson | B62M 9/12 | 474/80 |
| 5,857,932 A * | 1/1999 | Sugimoto | B62L 1/14 | 474/82 |
| 5,860,880 A * | 1/1999 | Oka | B62M 9/1242 | 474/77 |
| 5,865,698 A * | 2/1999 | Huang | B62M 9/1242 | 474/80 |
| RE36,830 E * | 8/2000 | Lumpkin | B62M 25/02 | 474/79 |
| 6,203,459 B1 * | 3/2001 | Calendrille, Jr. | B62J 13/00 | 464/172 |
| 6,234,926 B1 * | 5/2001 | Soon | B25B 27/0071 | 188/24.11 |
| 6,287,228 B1 * | 9/2001 | Ichida | B62M 9/1248 | 474/80 |
| 6,350,212 B1 * | 2/2002 | Campagnolo | B62M 9/126 | 474/80 |
| 6,394,921 B1 * | 5/2002 | Fukuda | B62M 9/126 | 474/80 |
| 6,405,613 B1 * | 6/2002 | Lim | B62M 9/127 | 74/502.4 |
| 6,517,456 B1 * | 2/2003 | Savard | B62M 25/02 | 474/82 |
| 6,793,598 B1 * | 9/2004 | Savard | B62M 9/1248 | 474/80 |
| 7,090,603 B2 * | 8/2006 | Shahana | B62J 23/00 | 474/80 |
| 7,104,908 B2 * | 9/2006 | Nagano | B62M 9/1242 | 474/82 |
| 7,318,784 B2 * | 1/2008 | Onogi | B62M 9/1242 | 474/80 |
| 7,361,110 B2 * | 4/2008 | Oishi | B62M 9/1242 | 474/82 |
| 7,527,571 B2 * | 5/2009 | Shahana | B62M 9/1248 | 474/80 |
| 7,549,662 B2 * | 6/2009 | Righi | B62M 9/122 | 280/257 |
| 7,614,972 B2 * | 11/2009 | Oseto | B62M 9/1244 | 474/80 |
| 7,666,111 B2 * | 2/2010 | Shahana | B62M 9/125 | 474/83 |
| 7,722,488 B2 * | 5/2010 | Kunisawa | B62M 9/126 | 474/82 |
| 8,007,383 B2 * | 8/2011 | Watarai | B62M 9/1242 | 474/82 |
| 8,012,052 B2 * | 9/2011 | Shahana | B62M 9/126 | 474/82 |
| 8,057,332 B2 * | 11/2011 | Takachi | B62M 9/1242 | 474/80 |
| 8,277,346 B2 * | 10/2012 | Watarai | B62M 9/126 | 474/82 |
| 8,419,573 B2 * | 4/2013 | Yamaguchi | B62M 9/127 | 474/82 |
| 8,870,692 B2 * | 10/2014 | Yamaguchi | B62M 9/126 | 474/80 |
| 9,033,833 B2 * | 5/2015 | Johnson | B62M 25/04 | 474/80 |

* cited by examiner

BICYCLE REAR DERAILLEUR

BACKGROUND OF THE INVENTION

Field of the Invention

The present invention relates to a bicycle rear derailleur.

Description of the Prior Art

When riding a multi-speed bicycle, a user can switch gears according to different strength requirements (plane, uphill, downhill or other environments), so this type of bicycle is widely popular.

A derailleur of the multi-speed bicycle is pivoted to a part of the multi-speed bicycle via a fixing seat. The derailleur is suspended and supported by the fixing seat, when a shift cable is pulled, a shift member is comoved to make a guiding mechanism to move laterally and further make a chain to switch to different gears in different dimensions on a gear set so as to shift gear.

However, regarding the derailleur of the conventional multi-speed bicycle, TWI331111 discloses a lower rear-facing derailleur, an actuation arm is disposed between a chain guide and a rear wheel axle. When the lower rear-facing derailleur is mounted to a frame, a mounting tool or hands of the user may contact a spoke of a rear wheel, so it is difficult to mount the lower rear-facing derailleur. In addition, an end of the actuation arm which is closer to the spoke of the rear wheel has a cable fixing point which is for fixing a cable, and when riding, the cable and the spoke may easily contact or impact each other and cause safety risk. Therefore, CN204096023U is disclosed, a second linkage assembly can be easily disposed on a lateral exterior side of a linkage assembly; however, since the second linkage is remote from the linkage assembly, when the user rides the bicycle in mountains or off-road, the second linkage may tangle with branches or other objects. Furthermore, the second linkage tilts toward an outer side, so it has a greater chance to impact road surface to damage the structure, and the user has to examine and maintain regularly and thus spend more on maintenance.

The present invention has arisen to mitigate and/or obviate the afore-described disadvantages.

SUMMARY OF THE INVENTION

The major object of the present invention is to provide a bicycle rear derailleur, which can smoothly and accurately shift gear.

To achieve the above and other objects, a bicycle rear derailleur is provided, including a mounting portion, for being mounted to a bicycle; a linkage mechanism, pivoted to the mounting portion and having an extension portion for fixing a shift line, the extension portion having a cable fixing point, the extension portion being located at an inner position relative to an outer side of the linkage mechanism; a guiding mechanism, pivoted to the linkage mechanism and being rotatable about an axis, the guiding mechanism including a first pulley which is relatively closer to the axis and a second pulley which is relatively farther from the axis, the first pulley defining a pulley plane, an extension line which is perpendicular to the axis and an axial extension line of the second pulley being defined as a first reference line; wherein when the bicycle rear derailleur is mounted to the bicycle and located on an initial position which is relatively lower, the cable fixing point is between the first reference line and the mounting portion, and the cable fixing point dose not cross the pulley plane during gearshift of the bicycle rear derailleur relative to rear sprockets.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
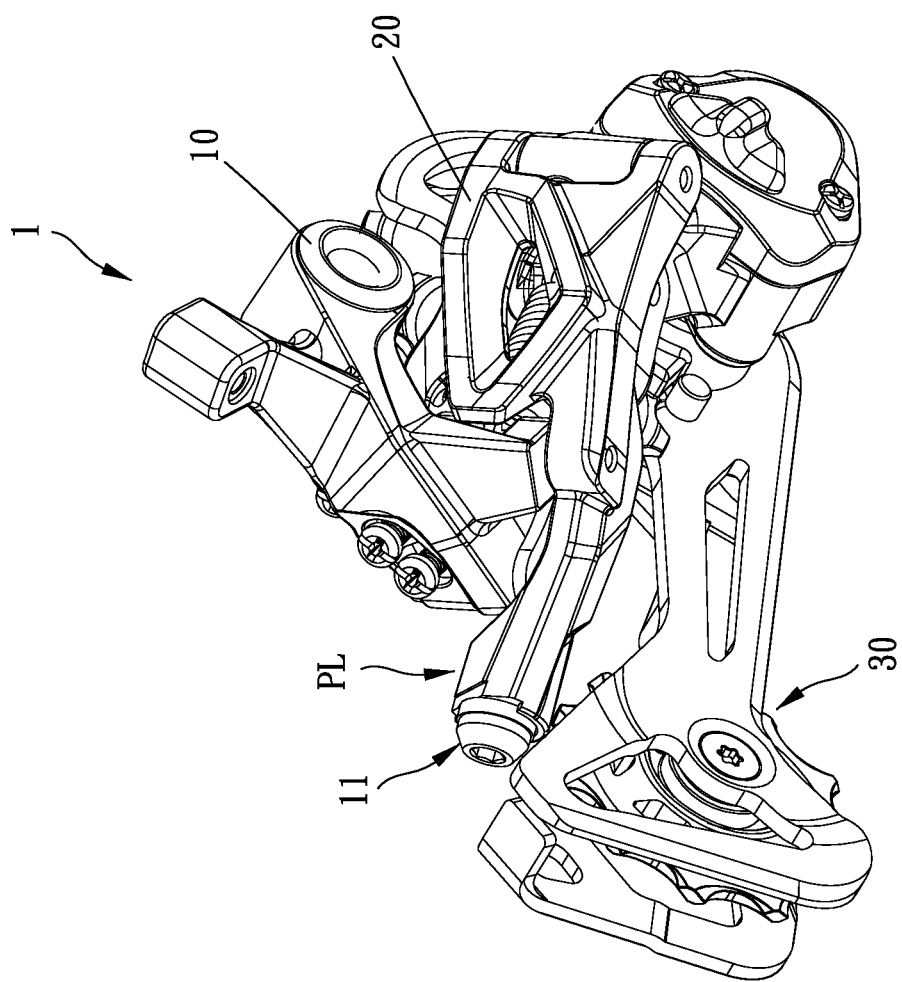
FIG. 1 is a stereogram of a preferred embodiment of the present invention in a collapsed state.
Figure 2:
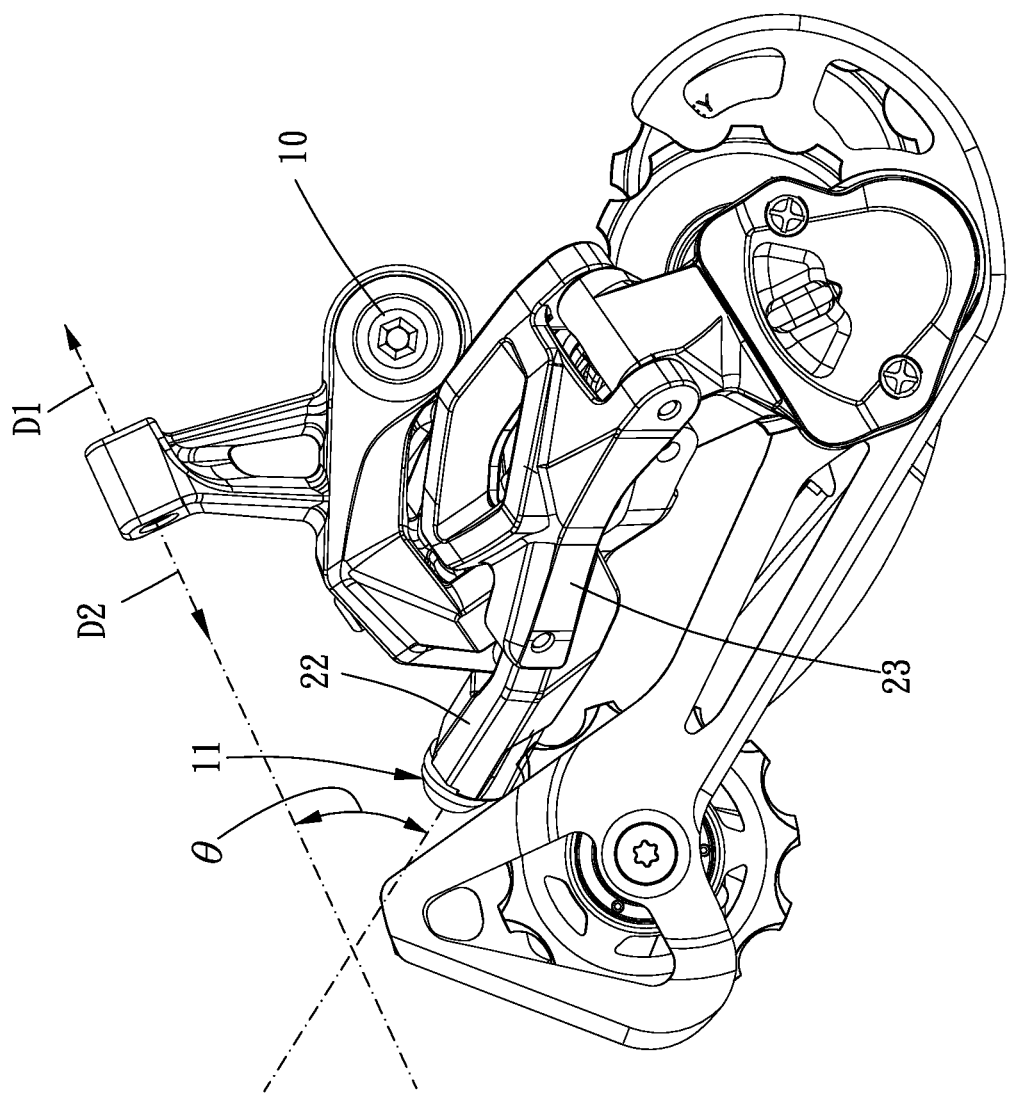
FIG. 2 is a right side view of FIG. 1.
Figure 3:
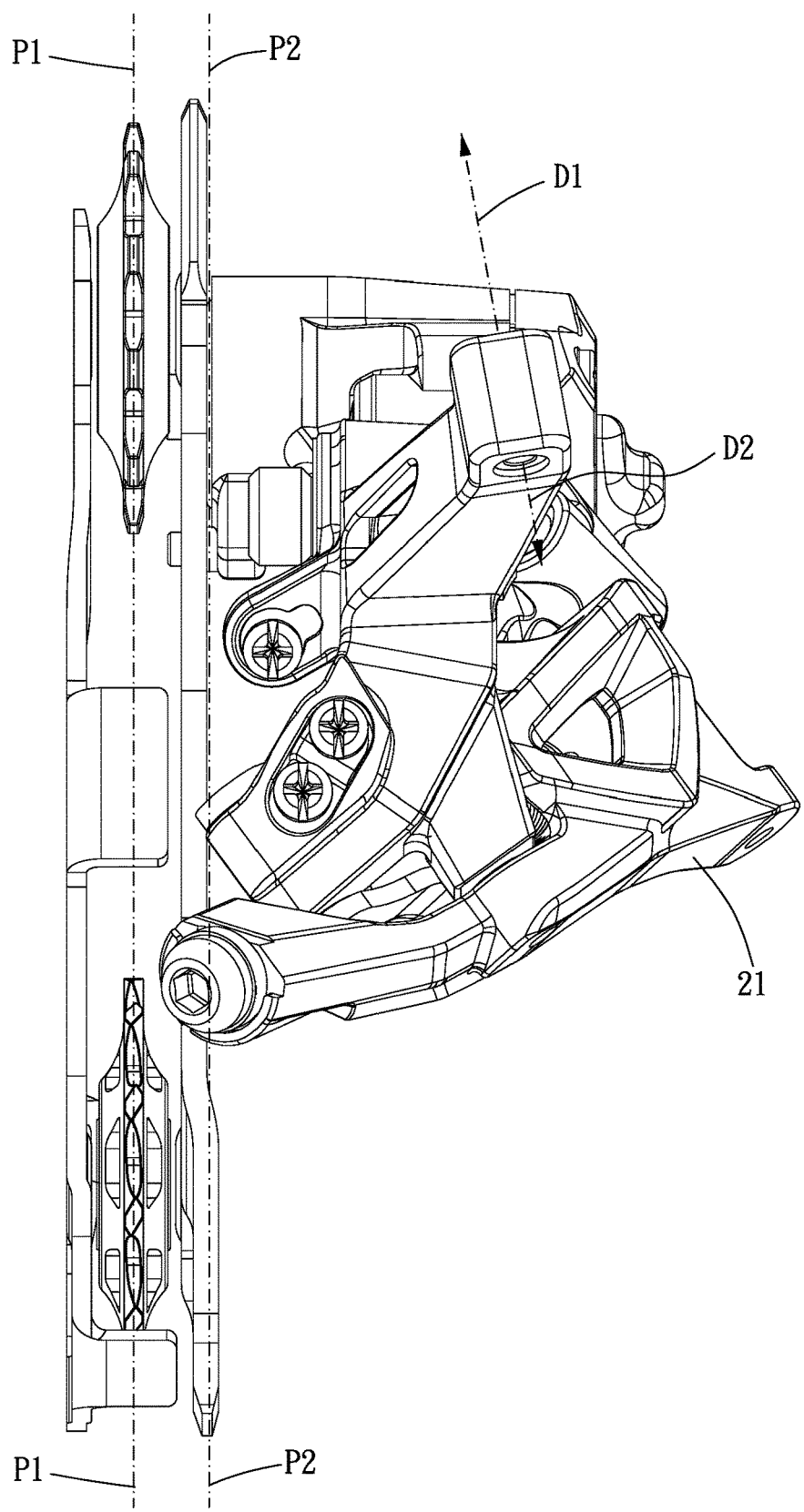
FIG. 3 is a top view of FIG. 1.
Figure 4:
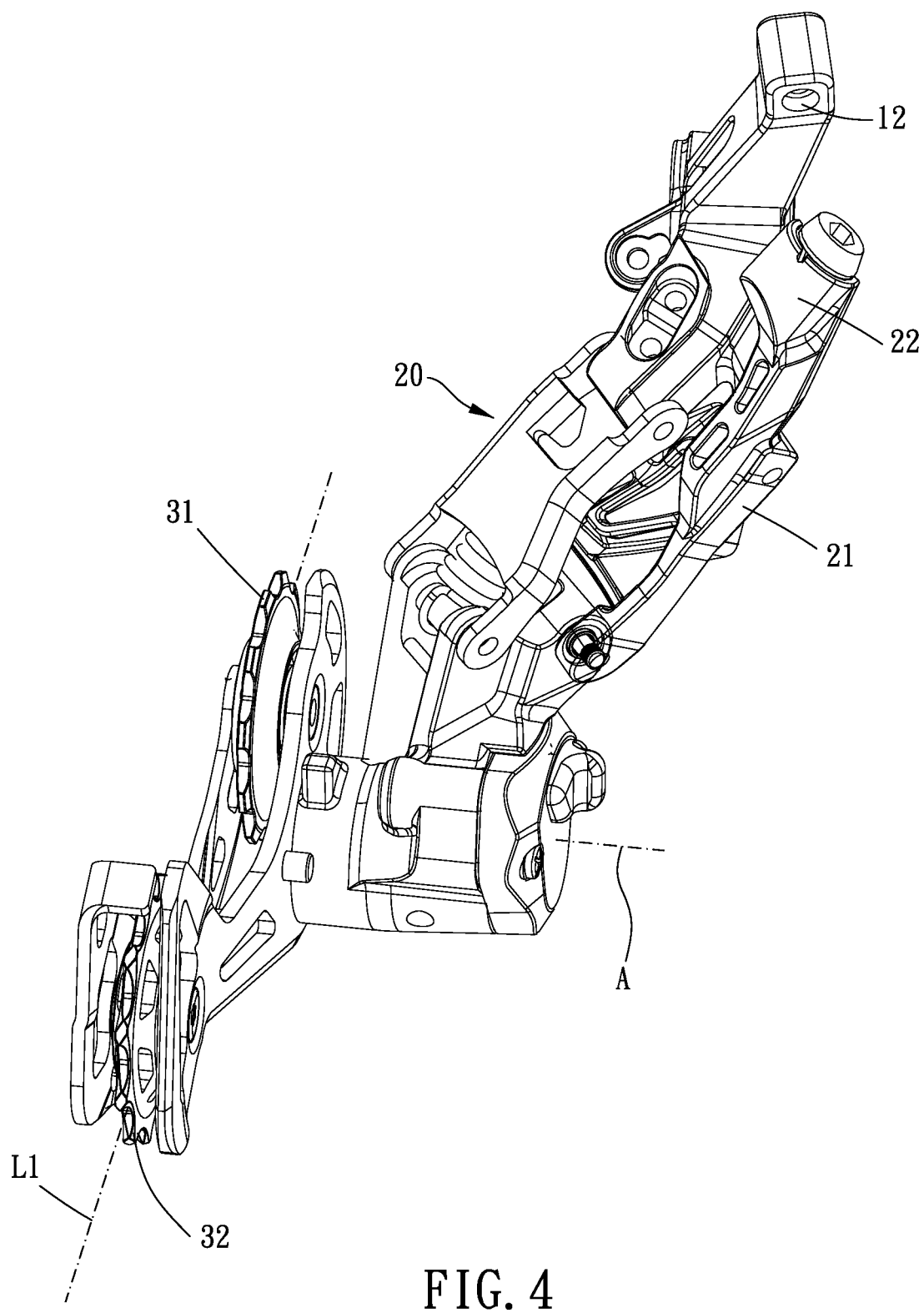
FIG. 4 is a stereogram of the preferred embodiment of the present invention in an open state.
Figure 5:
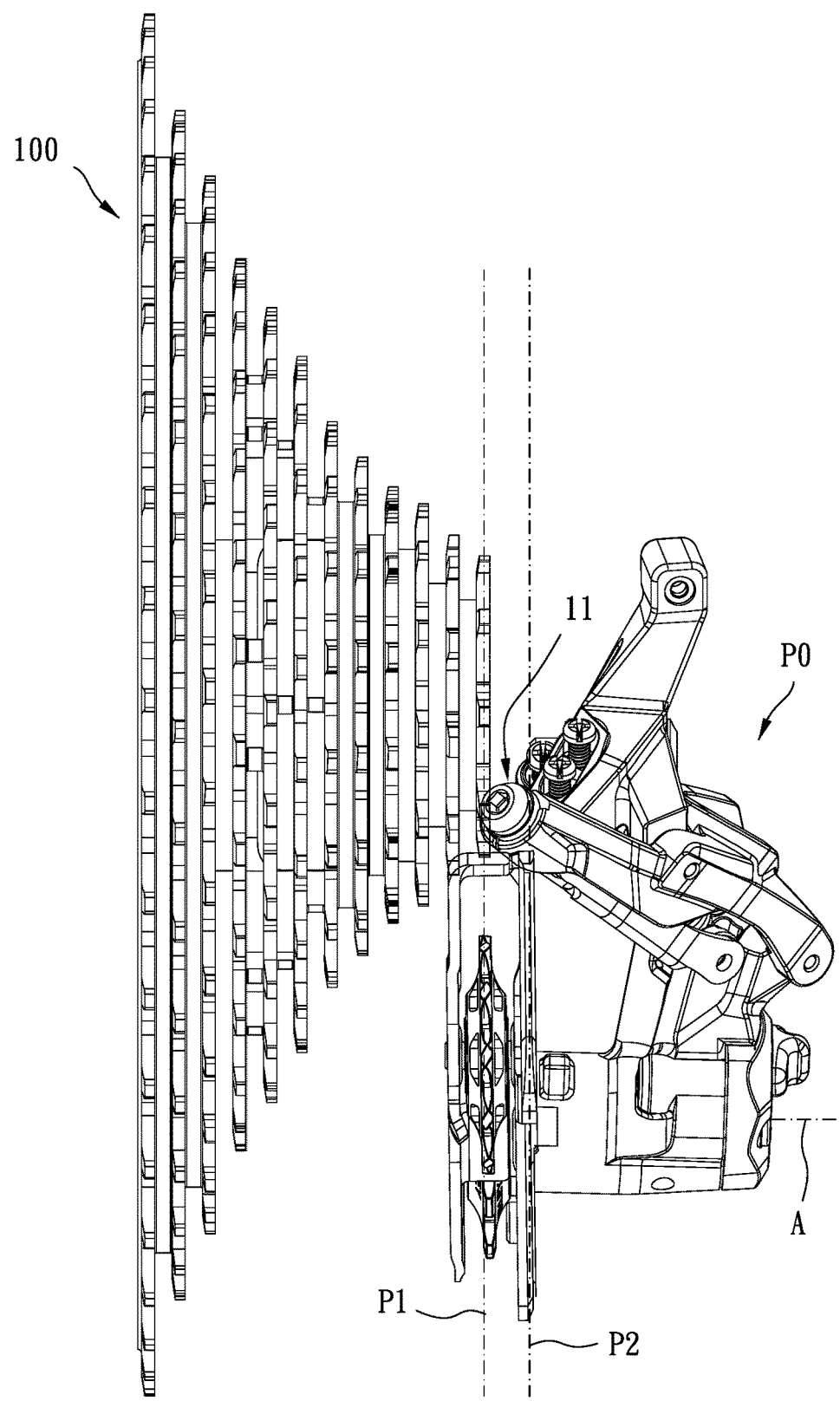
FIGS. 5 and 6 are drawings showing the preferred embodiment of the present invention during a gear shifting process.
Figure 6:
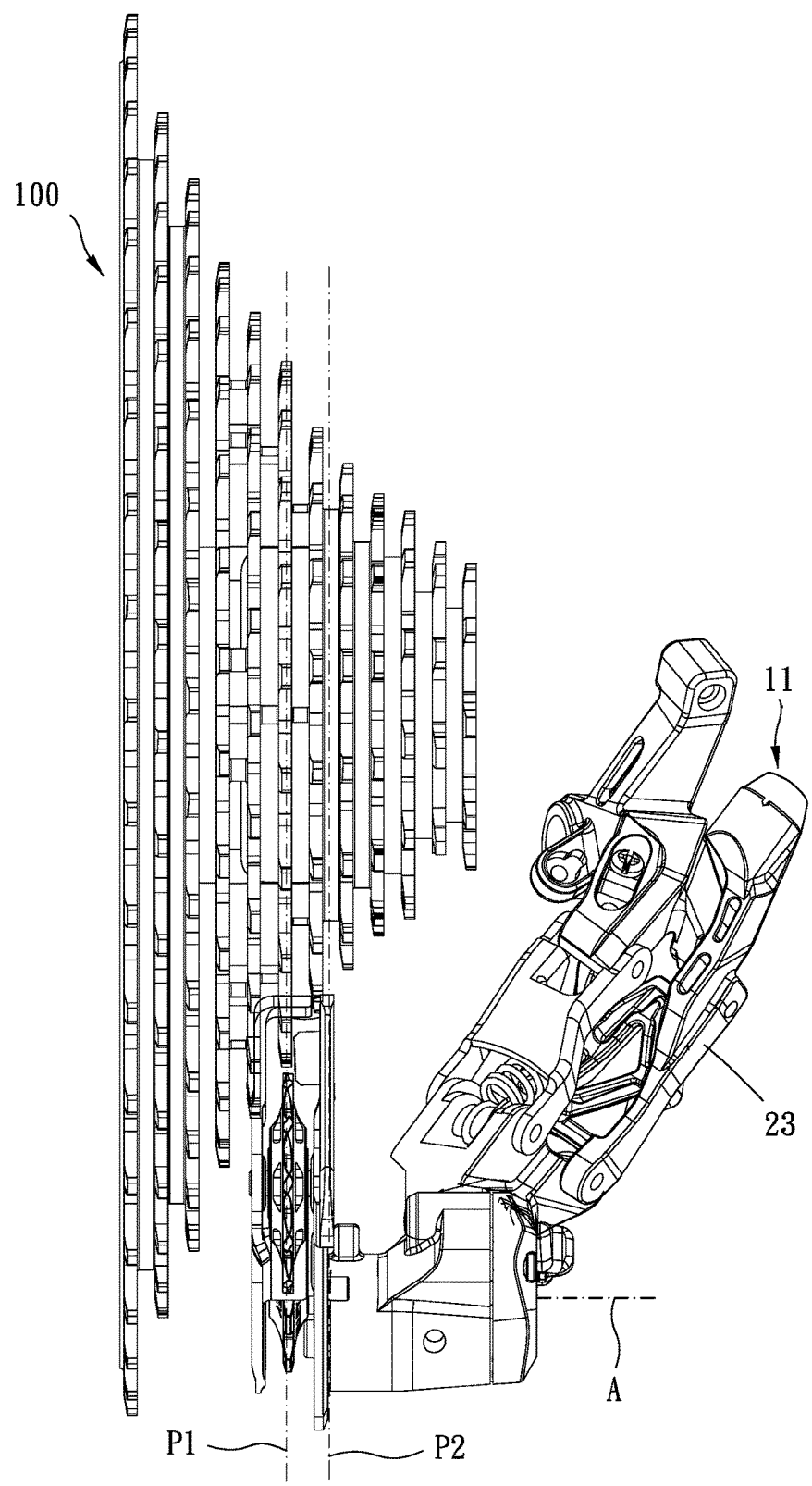

Please refer to FIGS. 1 to 6 for a preferred embodiment of the present invention. A bicycle rear derailleur 1 includes a mounting portion 10, a linkage mechanism 20 and a guiding mechanism 30.

The mounting portion 10 is for being mounted to a bicycle. The linkage mechanism 20 is pivoted to the mounting portion 10 and has an extension portion 22 for fixing a shift line, the extension portion 22 has a cable fixing point 11, and the extension portion 22 is on an inner side of an exterior side face 21 of the linkage mechanism 20. The guiding mechanism 30 is pivoted to the linkage mechanism 20 and is rotatable about an axis A, the guiding mechanism 30 includes a first pulley 31 which is relatively closer to the axis A and a second pulley 32 which is relatively farther from the axis A, the first pulley 31 has a pulley plane P1, in this embodiment, the pulley plane P1 is a plane which divides the first pulley 31 into two equal halves, but the pulley plane P1 may also be a plane on the left or right side of the first pulley 31, or a plane which is perpendicular to axial extension lines of the first and second pulleys 31, 32 and passes the first and second pulleys 31, 32, and an extension line which is perpendicular to the axis A and the axial extension line of the second pulley 32 is defined as a first reference line L1. When the bicycle rear derailleur 1 is mounted to the bicycle and located on an initial position P0 which is relatively lower, the cable fixing point 11 is between the first reference line L1 and the mounting portion 10, and the cable fixing point 11 dose not cross the pulley plane P1 during gearshift of the bicycle rear derailleur 1 relative to rear sprockets 100 Therefore, the bicycle can smoothly and accurately shift gear.

The mounting portion 10 may be integrally formed or composed of multiple members. The mounting portion 10 has a cable-guiding hole 12 for guiding the shift cable, one of two ports of the cable-guiding hole 12 faces a first pointing direction D1, and the first pointing direction D1 gradually tilts toward the pulley plane P1, so the shift cable does not need to be bent overly, and there is no need of additional cable guide. In this embodiment, the other of the two ports of the cable-guiding hole 12 faces a second pointing direction D2 (here, the second pointing direction D2 is on the same extension line with the first pointing direction D1), and the second pointing direction D2 gradually tilts away from the pulley plane P1, for example, a projection of the second pointing direction D2 and an extension direction of the extension portion on the pulley plane P1 forms an included angle θ which is equal to or greater than 60 degree.

The linkage mechanism 20 has an extension portion 22, the extension portion 22 has the cable fixing point 11, specifically, the whole extension portion 22 is located by the inner side of the exterior side face 21 of the linkage mechanism 20, and the cable fixing point 11 is on an end of the extension portion 22 which is remote from the linkage mechanism 20. The linkage mechanism 20 includes a plurality of linkages 23 and forms a multi-linkage (for example, four linkages) parallel structure, and one of the plurality of linkages 23 is located by an outer side of an exterior side face of the mounting portion 10 to increase movement stability. Furthermore, the extension portion 22 is integrally formed and protrudes from the linkage mechanism 20, or the extension portion may also be formed in two-piece or other appropriate combinations.

Preferably, the cable fixing point 11 maintains within a range from the cable fixing point 11 to the second pointing direction D2 during the gear shifting process. A plane which is parallel to the pulley plane P1 and located between the linkage mechanism 20 and the guiding mechanism 30 is defined as a reference plane P2, and the cable fixing point 11 exceeds beyond the reference plane P2 during the gear shifting process. In addition, a structure of the present invention can be designed in other ways, for example, a state of the linkage mechanism 20 being blocked relative to the guiding mechanism 30 may be defined as a low point collapsed state PL (same as the collapsed state before being mounted to the bicycle), and when the linkage mechanism 20 is in the low point collapsed state PL, the cable fixing point 11 is between the pulley plane P1 and the exterior side face 21 of the linkage mechanism 20 and between the first reference line L1 and the mounting portion 10. In that way, the bicycle rear derailleur 10 can have thinner thickness and greater gear shifting range.

While we have shown and described various embodiments in accordance with the present invention, it should be clear to those skilled in the art that further embodiments may be made without departing from the scope of the present invention.

What is claimed is:

1. A bicycle rear derailleur, including: a mounting portion, for being mounted to a bicycle;
a linkage mechanism, pivoted to the mounting portion and having an extension portion for fixing a shift line, the extension portion having a cable fixing point, the extension portion being located at an inner position relative to an outer side of the linkage mechanism;
a guiding mechanism, pivoted to the linkage mechanism and being rotatable about an axis, the guiding mechanism including a first pulley which is relatively closer to the axis and a second pulley which is relatively farther from the axis, the first pulley having a pulley plane perpendicular to a first pulley rotational axis through a middle of the first pulley, and a reference line passing within the pulley plane through the first pulley rotational axis and a second rotational pulley axis;
wherein when the bicycle rear derailleur is mounted to the bicycle and located on an initial position which is in a low point collapsed state, the cable fixing point is between the first reference line and the mounting portion, and the cable fixing point does not cross the pulley plane during gearshift of the bicycle rear derailleur relative to rear sprockets.

2. The bicycle rear derailleur of claim 1, wherein the linkage mechanism includes a plurality of linkages, and one of the plurality of linkages is located by an outer side of an exterior side face of the mounting portion.

3. The bicycle rear derailleur of claim 1, wherein the mounting portion has a cable-guiding hole for guiding the shift cable, one of two ports of the cable-guiding hole faces a first pointing direction, and the first pointing direction gradually tilts toward the pulley plane.

4. The bicycle rear derailleur of claim 1, wherein the mounting portion has a cable-guiding hole for guiding the shift cable, one of two ports of the cable-guiding hole faces a second pointing direction, and the second pointing direction gradually tilts away from the pulley plane.

5. The bicycle rear derailleur of claim 4, wherein the cable fixing point maintains within a range from the cable fixing point to the second pointing direction during the gear shifting process.

6. The bicycle rear derailleur of claim 4, wherein the linkage mechanism has an extension portion, the extension portion has the cable fixing point, a plane which is parallel to the pulley plane and located between the linkage mechanism and the guiding mechanism is defined as a reference plane, and the cable fixing point exceeds beyond the reference plane during the gear shifting process.

7. The bicycle rear derailleur of claim 4, wherein a projection of the second pointing direction and an extension direction of the extension portion on the pulley plane forms an included angle which is equal to or greater than 60 degree.

8. The bicycle rear derailleur of claim 1, wherein a state of the linkage mechanism being blocked relative to the guiding mechanism is defined as a low point collapsed state, and when the linkage mechanism is in the low point collapsed state, the cable fixing point is between the pulley plane and the exterior side face of the linkage mechanism and between the first reference line and the mounting portion.

* * * * *